United States Patent Office 3,266,882
Patented August 16, 1966

---

3,266,882
HERBICIDAL COMPOSITIONS AND THEIR USE
Marcel A. Gradsten, Demarest, N.J., assignor to Tenneco
Chemicals, Inc., a corporation of Delaware
No Drawing. Filed Sept. 20, 1965, Ser. No. 488,783
7 Claims. (Cl. 71—2.3)

This is a continuation-in-part of copending patent application Serial No. 179,461, which was filed on March 13, 1962.

This invention relates to novel herbicidal compositions and to methods of inhibiting plant growth. More particularly, it relates to methods for the control or inhibition of plant growth that comprise applying to the plants or to a medium normally supporting plant growth a phytotoxic amount of a polychlorophenyl methylene bis (dialkyldithiocarbamate).

In accordance with this invention, it has been discovered that the polychlorophenyl methylene bis (dialkyldithiocarbamates) that have the structural formula

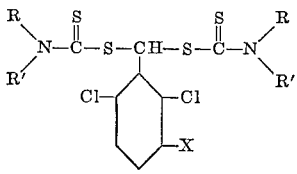

wherein X represents hydrogen or chlorine and R and R' each represents an alkyl group having from 1 to 4 carbon atoms, have unusual and valuable activity as selective herbicides. Illustrative of these compounds are the following: 2,6-dichlorophenyl methylene bis (dimethyldithiocarbamate), 2,6-dichlorophenyl methylene bis (dipropyldithiocarbamate), 2,6-dichlorophenyl methylene bis (dibutyldithiocarbamate), 2,3,6-trichlorophenyl methylene bis (dimethyldithiocarbamate), and 2,3,6-trichlorophenyl methylene bis (dibutyldithiocarbamate).

These polychlorophenyl methylene bis (dialkyldithiocarbamates) may be applied to the soil or other medium normally supporting plant growth to control or inhibit the growth of plants, or they may be applied to plants to control their growth.

The polychlorophenyl methylene bis (dialkyldithiocarbamates) may be applied to a wide variety of plants to inhibit their growth. They may be applied to an area containing a crop to inhibit the growth of weeds therein, or they may be used to keep an area free from all plant growth.

While the herbicidal compounds may be applied to the plants as such, they are ordinarily and preferably used in combination with an inert diluent or carrier to make it easier to measure accurately and to apply evenly the small amounts of the compounds that are required to inhibit plant growth as well as to apply them in a form that will be readily dispersed through the soil and/or absorbed by the plants. The compounds may be dispersed in water with or without the aid of a wetting agent and the resulting aqueous dispersions employed as sprays. Alternatively, the compounds may be used as the active herbicidal constituent in ketone, alcohol, ether, or hydrocarbon solutions or in oil-in-water emulsions. The compounds may also be mixed with or deposited upon finely-divided solid carriers, such as talc, clay, diatomaceous earth, silica, walnut shell flour, and the like, and employed as dusts. The concentration of the herbicidal compound in the composition may vary widely and depends upon a number of factors, the most important of which are the amount of the composition to be applied per unit of area and the type or types of plants being treated. In most cases the herbicidal compositions are applied as sprays or dusts that contain from about 0.1 percent to 50 percent and preferably 0.2 percent to 10 percent by weight of a polychlorophenyl methylene bis (dialkyldithiocarbamate). Mixtures of two or more of these compounds may be used; if desired, other herbicidal compounds may also be present in the herbicidal compositions.

The invention is further illustrated by the examples that follow.

Example 1

A mixture of 110 grams of sodium dimethyldithiocarbamate, 76 grams of 2,6-dichlorobenzal chloride, and 150 ml. of ethanol was heated at its reflux temperature (86° C.) for 5.5 hours. The reaction mixture was cooled to room temperature and filtered. The precipitate, which consisted of sodium chloride and unreacted sodium dimethyldithiocarbamate, was washed with two 20 ml. portions of ethanol. The filtrate and wash ethanol were combined and concentrated until the product crystallized. The product was isolated, washed with water, and dried. There was obtained 47 grams of 2,6-dichlorophenyl methylene bis (dimethyldithiocarbamate), a tan solid that melted at 225.5°–227.5° C. This product contained 17.70% Cl and 31.8% S (calculated for $C_{13}H_{16}Cl_2N_2S_4$: Cl, 17.5%; S, 32.1%).

Any of the aforementioned polychlorophenyl methylene bis (dialkylthiocarbamates) may be prepared by this procedure by using the appropriate alkali metal dialkyldithiocarbamate and polychlorobenzal halide.

Example 2

A series of tests was carried out in which 2,6-dichlorophenyl methylene bis (dimethyldithiocarbamate) was evaluated as a herbicide. In each case the compound was applied as a 0.3% aqueous suspension at a rate equivalent to 10 pounds per acre. In these tests, 2,6-dichlorophenyl methylene bis (dimethyldithiocarbamate) was found to be particularly effective in controlling the growth of monocotyledonous plants (crabgrass, Johnson grass, foxtail, etc.) when applied as a pre-emergence spray and particularly effective in controlling the growth of dicotyledonous plants (mustard, red clover, morning glory, etc.) when applied as a post-emergence spray.

Each of the other aforementioned polychlorophenyl methylene bis (dialkyldithiocarbamates) may be used in a similar manner as the active component in a herbicidal composition to control or inhibit plant growth.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. The method for the control of plant growth which comprises applying to a medium normally supporting plant growth a phytotoxic amount of a compound having the structure

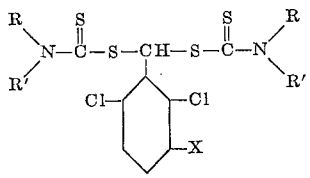

wherein X represents a member selected from the group consisting of hydrogen and chlorine and R and R' each represents an alkyl group having from 1 to 4 carbon atoms.

2. The method for the control of plant growth which comprises applying to a medium normally supporting plant growth a phytotoxic amount of 2,6-dichlorophenyl methylene bis (dimethyldithiocarbamate).

3. The method for the control of plant growth which comprises applying to the plants a phytotoxic amount of a compound having the structure

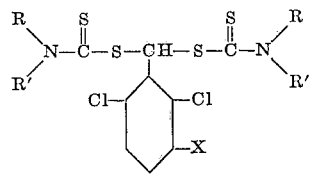

wherein X represents a member selected from the group consisting of hydrogen and chlorine and R and R' each represents an alkyl group having from 1 to 4 carbon atoms.

4. The method for the control of plant growth which comprises applying to the plants a phytotoxic amount of 2,6-dichlorophenyl methylene bis (dimethyldithiocarbamate).

5. A herbicidal composition comprising an inert carrier and about 0.1 percent to 50 percent by weight of a compound having the structure

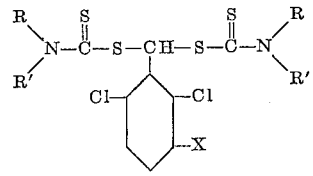

wherein X represents a member selected from the group consisting of hydrogen and chlorine and R and R' each represents an alkyl group having from 1 to 4 carbon atoms.

6. A herbicidal composition comprising an inert carrier and about 0.1 percent to 50 percent by weight of 2,6-dichlorophenyl methylene bis (dimethyldithiocarbamate).

7. A herbicidal composition comprising an aqueous suspension containing 0.2 percent to 10 percent by weight of 2,6-dichlorophenyl methylene bis (dimethyldithiocarbamate).

References Cited by the Examiner

UNITED STATES PATENTS

| | | | |
|---|---|---|---|
| 1,736,428 | 11/1929 | Cadwell | 260—455 |
| 1,873,934 | 8/1932 | Lommel et al. | 260—455 |
| 2,919,182 | 12/1959 | Harman et al. | 71—2.7 |

OTHER REFERENCES

MacKay et al., Chemical Abstracts, 1961, vol. 55 p. 12767(F).

LEWIS GOTTS, *Primary Examiner.*

JAMES O. THOMAS, *Examiner.*